United States Patent [19]
Teagle

[11] 3,767,034
[45] Oct. 23, 1973

[54] CHAIN-TYPE CONVEYORS
[76] Inventor: William Thomas Teagle, Blackwater, Truro, Cornwall, England
[22] Filed: Oct. 1, 1971
[21] Appl. No.: 185,772

[30] Foreign Application Priority Data
Oct. 5, 1970  Great Britain.................. 47,213/70

[52] U.S. Cl. ............................................... 198/196
[51] Int. Cl. ........................................... B65g 15/30
[58] Field of Search.................... 198/195, 196, 197, 198/109; 171/130, 131

[56] References Cited
UNITED STATES PATENTS

| | | | |
|---|---|---|---|
| 3,471,013 | 10/1969 | Haver | 198/195 X |
| 2,296,810 | 9/1942 | Dahlman | 198/197 |
| 552,716 | 1/1896 | Matthiessen | 198/195 X |
| 2,361,131 | 10/1944 | Smith | 198/109 |
| 618,092 | 1/1899 | Heineke | 198/109 |
| 2,149,776 | 3/1939 | Knoerzer | 198/195 |
| 2,753,039 | 7/1956 | Velten | 198/195 |

Primary Examiner—Edward A. Sroka
Attorney—Norris & Bateman

[57] ABSTRACT

A conveyor chain capable of use on a conveyor/elevator for agricultural produce is assembled from a plurality of identical transversely extending link members each of which is bent at its ends, first in a horizontal plane to form sockets for the transverse portion of the next link member, and then in a vertical plane to retain the next link member in the sockets and form upstanding side members which combine with the side members on the other links to provide shallow walls which prevent produce carried by the conveyor chain from rubbing against stationary parts of the conveyor and open out on passing around the chain sprockets to create a self-cleaning effect.

4 Claims, 8 Drawing Figures

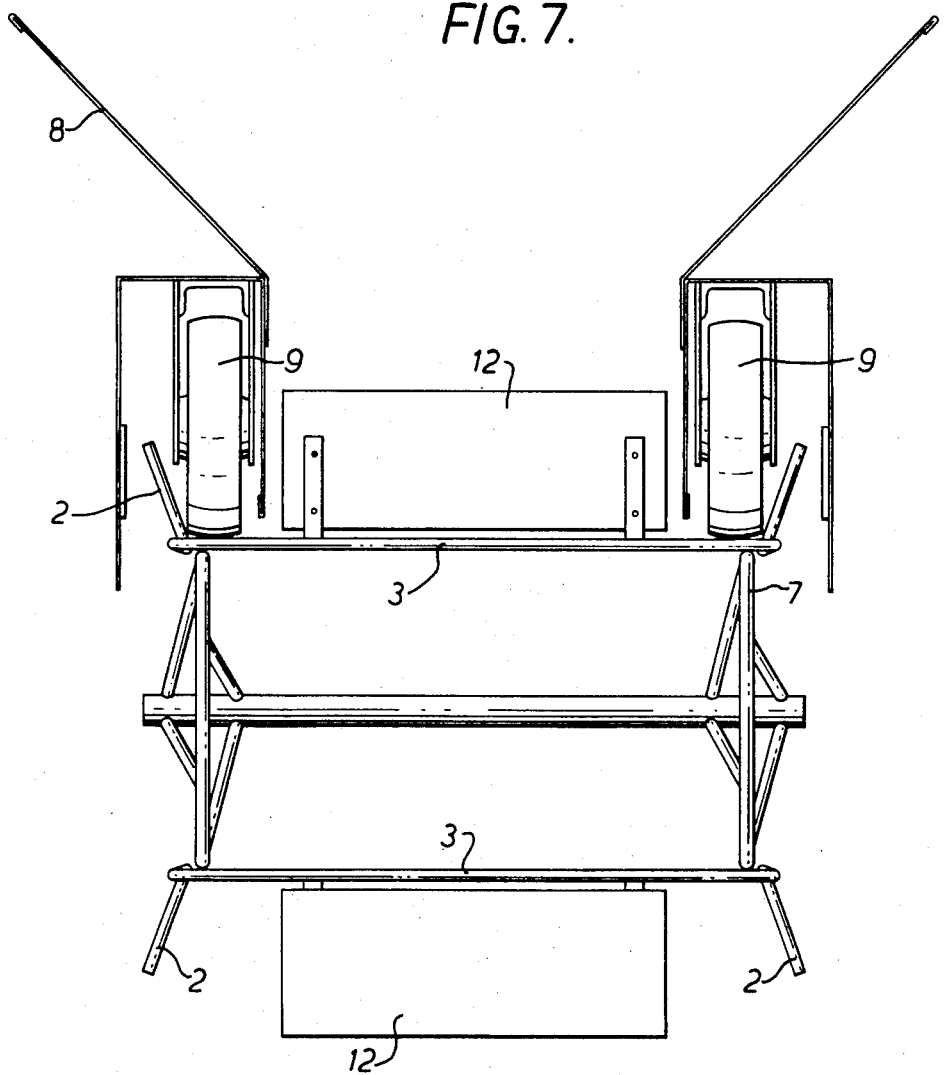

CHAIN-TYPE CONVEYORS

This invention relates to chain-type conveyors as used, for example, for elevating potatoes, root crops, sacked produce and the like and provides a novel form of chain link or component, a plurality of which can be assembled together to form an efficient chain conveyor the links of which cannot come apart in service and have a self-cleaning action and the scrubbing effect of which on the produce carried by the conveyor is considerably reduced.

According to the invention, a conveyor chain is constructed from a series of interconnected links or components each of which comprises a transversely extending bar, the end portions of which are bent to form longitudinally extending socket structures which receive the transverse bar of the next link or component and include terminal portions each of which extends at an acute angle to the plane containing the transverse bars.

One embodiment of the invention will be described, by way of example, with reference to the accompanying drawings in which:

FIG. 7 is an end view of the conveyor as viewed from the left in FIG. 6; and

Figure 1:
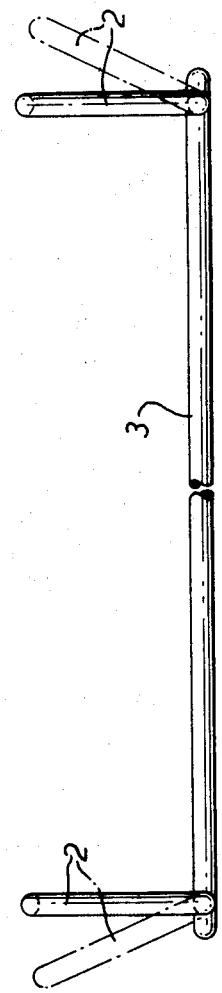
FIG. 1 is a side elevation.
Figure 2:
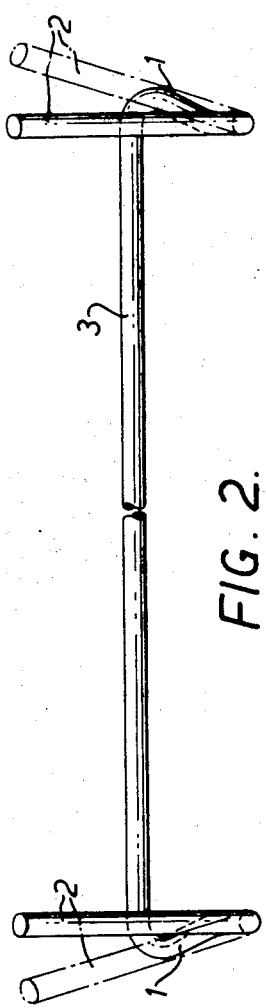
FIG. 2 is a plan view.
Figure 3:
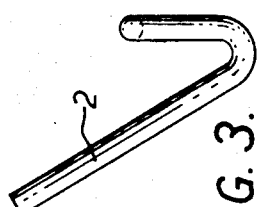
FIG. 3 is an end view of a component for assembly with identical components to form a conveyor chain in accordance with the invention.

Referring to FIGS. 1 to 3, each link or component consists of a length of, for example, five-sixteenths of an inch round steel bar each end portion of which is first bent in a horizontal plane through approximately 300° as shown at 1 in FIG. 2 and the terminal part 2 of said end portion is then bent upwardly to an approximately vertical position (not shown).

Figure 4:
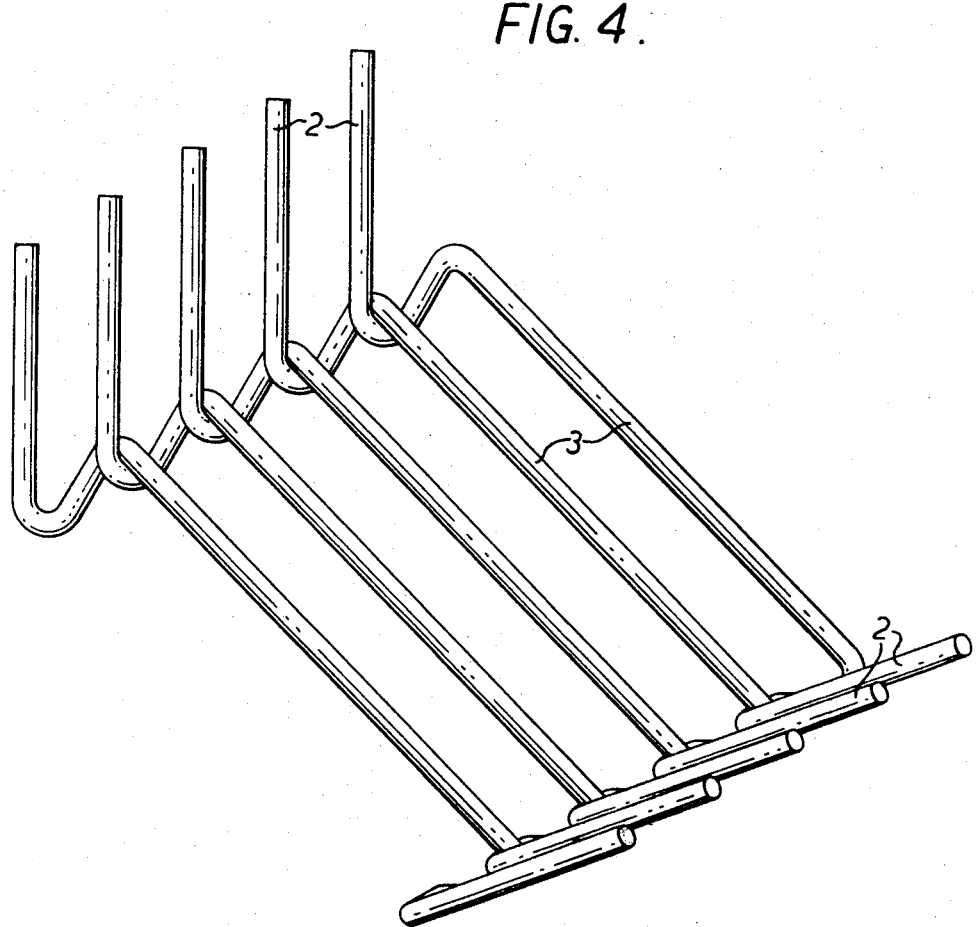
FIG. 4 is a perspective view of a number of the links shown in FIGS. 1 to 3, assembled together to form a part of a conveyor chain in accordance with the invention; U-shaped to FIG. 5 is a side elevational view of a part of a conveyor chain constructed in accordance with the invention, showing the manner in which the socket structures open out in passing around a chain sprocket.

A plurality of the components shown in FIGS. 1 to 3 can then be assembled to form a conveyor chain of the kind shown in FIG. 4 by engaging the straight central portion 3 of one component over the two vertical terminal portions 2 of another component and then bending said portions 2 downward, as shown in full lines in FIGS. 1 to 3, such that they lie in longitudinal vertical planes and extend at an acute angle, preferably in the region of 20°-30° to the horizontal and also outward to the position shown in broken lines in FIGS. 1 and 2 so that they also extend at an acute angle to the vertical. Thus the end portions of each component form substantially U-shaped sockets in the roots of which the transversely extending portion 3 of the next component is received and can pivot or oscillate. As shown in FIG. 4 the series of sockets at each side of the chain lie in a common plane and the terminal portions 2 form shallow upstanding side walls. Thus the complete chain is of trough-like form, thereby reducing considerably the damage by scrubbing action to produce carried thereon when the chain is moving between the stationary supporting surfaces of a conveyor.

Figure 5:
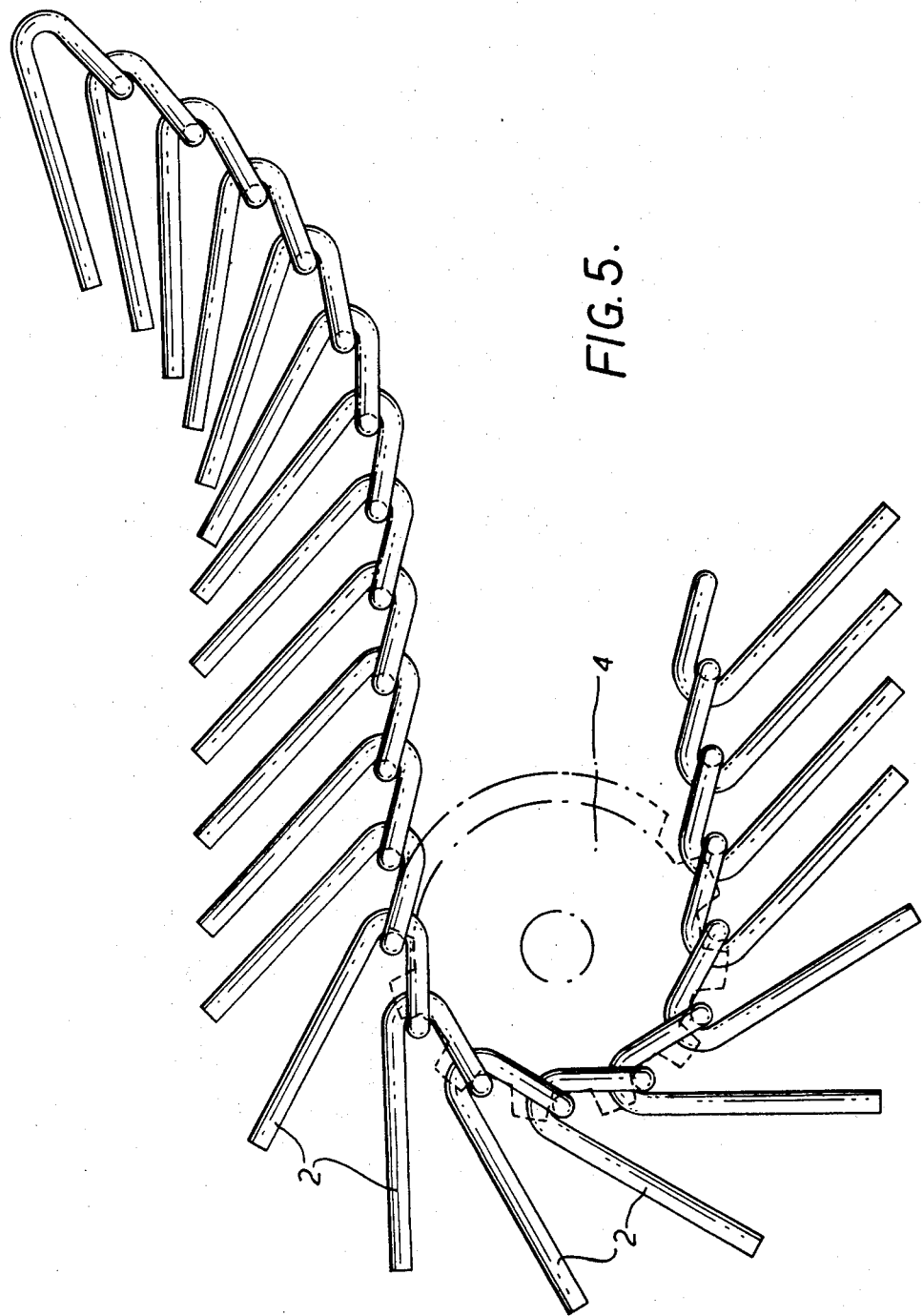

As the terminal portions 2 of each chain component are bent downward to form the sockets, they overlie the equivalent portions of the preceding component and the links of the complete chain cannot therefore come apart in use. On the other hand, when the chain passes over a driving or supporting sprocket 4 (FIG. 5) at one or other end of a conveyor the relative pivotal movement of the links causes the terminal end portions 2 of neighbouring components to open out relatively to one another, as shown in FIG. 5, so that they automatically perform a self-cleaning action.

Figure 6:
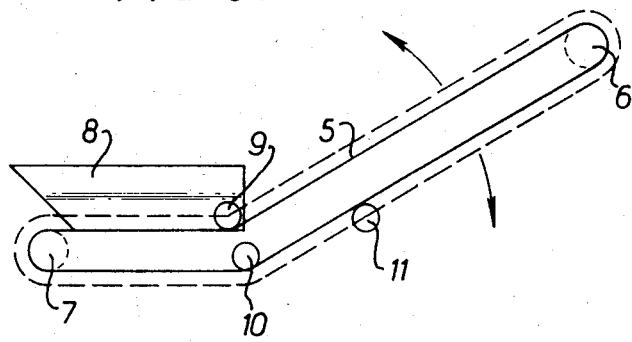
FIG. 6 is a diagrammatic side elevation of a conveyor employing a conveyor chain in accordance with the invention.
Figure 8:
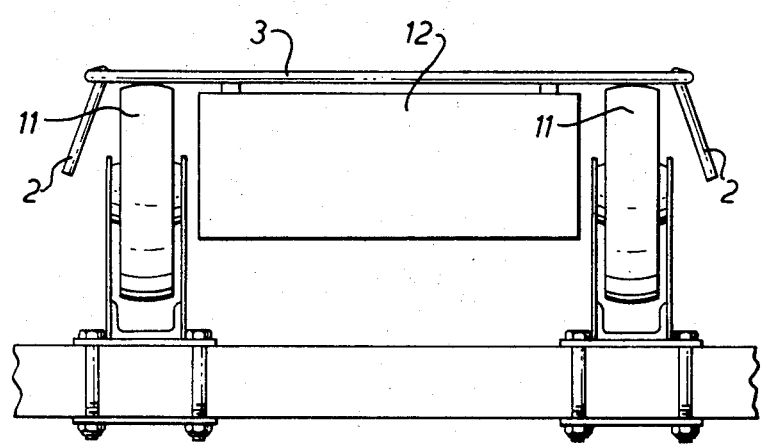
FIG. 8 is a view of a detail of the conveyor shown in FIG. 6.

FIGS. 6 to 8 show a chain conveyor employing an endless conveyor chain 5, assembled in the manner shown in FIG. 4, which passes around drive and supporting sprockets 6 and 7 which are journalled in angularly movable and fixed parts of the conveyor respectively. The angularly movable part of the conveyor which is adjustable in the directions of the arrows in FIG. 6 in accordance with the level at which produce loaded onto the conveyor through a hopper 8 is to be discharged, extends outwardly from rollers 9 and 10 rotatably mounted in the conveyor frame and engaging the upper surfaces of the transverse portions 3 of the chain links. The under surfaces of the portions 3, of the chain are engaged by rollers 11 (FIGS. 6 and 8) rotatably mounted in the angularly adjustable part of the conveyor frame. In order to increase the capacity of the conveyor when the adjustable part thereof is employed as an elevator, plates 12 (FIGS. 7 and 8) of rubber or other suitable resilient material are secured to the transverse portions 3 of the chain links.

I claim:

1. A chain conveyor comprising a horizontal input section and a discharge section which is angularly adjustable about a horizontal axis relative to said input section, chain sprockets rotatably mounted at the inner end of said input section and the outer end of said discharge section, driving means operatively connected to one of said chain sprockets, an endless conveyor chain passing around said sprockets and made up of a plurality of interconnected bars each having a straight horizontal central portion and ends bent out of alignment with said central portion to form upwardly open sockets which pivotally receive the central portion of the next bar and to form outer wall portions of the conveyor, said ends each consisting of an inner portion bent through an obtuse angle relative to and in the same horizontal plane as the central portion and an outer portion bent upwardly and outwardly from said inner portion at acute angles to both the horizontal and vertical planes of said central portion, first rollers rotatably mounted at the junction of said input and discharge sections in engagement with the upper surfaces of the operative and return runs respectively of the conveyor chain and second rollers rotatably mounted on said discharge section in engagement with the lower surface of the return run of the conveyor chain.

2. A conveyor chain according to claim 1, wherein said upwardly bent portions lie in common planes on each side of the conveyor chain and form shallow upstanding side walls.

3. A conveyor chain according to claim 1, wherein the transverse portion of each link carries an upstanding plate of resilient material.

4. A conveyor chain comprising a series of interconnected links, each of which comprises a transversely extending horizontal portion and two end portions bent to form upwardly open sockets which pivotally receive the transverse portion of the next link, the sockets at the ends of each link comprising in succession a first portion bent in a horizontal plane through an obtuse angle and a terminal portion bent upwardly and outwardly from the end of said first portion at acute angles to both the horizontal and vertical.

* * * * *